United States Patent
Sun et al.

(10) Patent No.: US 6,980,159 B2
(45) Date of Patent: Dec. 27, 2005

(54) PORTABLE ELECTRICAL DEVICE WITH PLANAR ANTENNA

(75) Inventors: Jellent Sun, Yung Ho (TW); Ten-Long Deng, Hsinchu Hsien (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 10/785,186

(22) Filed: Feb. 25, 2004

(65) Prior Publication Data

US 2004/0164911 A1    Aug. 26, 2004

(51) Int. Cl.[7] ............................................. H01Q 1/24
(52) U.S. Cl. .............................. 343/702; 343/700 MS
(58) Field of Search .................... 343/702, 700 MS; 455/90.3

(56) References Cited

U.S. PATENT DOCUMENTS

| | | | |
|---|---|---|---|
| 6,388,627 B1 * | 5/2002 | Masaki et al. | 343/702 |
| 6,424,303 B1 * | 7/2002 | Tsai | 343/702 |
| 6,509,877 B2 * | 1/2003 | Masaki | 343/702 |
| 6,531,985 B1 * | 3/2003 | Jones et al. | 343/702 |
| 6,636,181 B2 * | 10/2003 | Asano et al. | 343/702 |
| 6,670,926 B2 * | 12/2003 | Miyasaka | 343/702 |
| 6,686,886 B2 * | 2/2004 | Flint et al. | 343/702 |
| 6,728,559 B2 * | 4/2004 | Masaki | 455/575.5 |
| 6,751,476 B2 * | 6/2004 | Masaki et al. | 455/558 |

* cited by examiner

*Primary Examiner*—Tan Ho
(74) *Attorney, Agent, or Firm*—Rabin & Berdo, PC

(57) ABSTRACT

A portable electrical device with a planar antenna for wireless transmitting data includes a host case for assembling a motherboard therein and a display module pivotally connected to the host case. The display module has a housing for containing a display panel and the planar antenna. The planar antenna is connected to the motherboard via a transmitting line for transmitting and receiving the signals to and from the planar antenna.

12 Claims, 4 Drawing Sheets

PORTABLE ELECTRICAL DEVICE WITH PLANAR ANTENNA

FIELD OF THE INVENTION

The present invention relates to a portable electrical device with an antenna device, and more particularly, to a design of fabricating a PCB antenna onto the edge of the display panel of a notebook.

BACKGROUND OF THE INVENTION

With rapid development and progress of electronic technology, notebooks of a new generation provide a powerful operation function and are widely used in a company and personal consumers. Moreover, local networks are constructed in most of companies or industries by installing cables and servers so as to effectively connect those notebooks and communicate or exchange various information and data. However, wired networks are relatively expensive in design and layout, and construction and wiring of the wired networks frequently cause damage to rented office buildings, and densely spread wire lines are too complicated to manage and maintain. Therefore, wireless networks have been used in many companies or industries to construct the desired inner networks.

Nowadays, the notebook usually has an exteranl antenna device placed on the outside thereof, so as to make the notebook be capable of transmitting and receiving wireless signals to and from wireless access points. Please refer to FIG. 1, the typical manner of wireless network connecting is disposing an external antenna device 14 on the housing of a LCD display 12 of the notebook 10. Generally, the antenna device 14 has to face the wireless access points for wireless transmitting data and signals. The antenna device 14 is connected to a network card 18 of the notebook 10 via a cable line 16, so as to transmit radio frequency signals received by the antenna device 14 to the network card 18 for decoding. Certainly, for promoting the signal receiving efficiency, the antenna device 14 can be disposed in any other positions.

However, in the above manner the antenna device 14 and the cable line 16 are externally connected to the notebook 10 for wireless connection. Therefore, it is inconvenient for users to carry the antenna device 14 and cable line 16 with the notebook 10 simultaneously when they want to utilize the wireless network function of the notebook 10 in different places. Further, the antenna device 14 disposed on the top edge of the LCD display 12 and the cable line 16 usually suffer damage due to incautious bump or stumble by the users.

For overcoming the above issues, some manufacturer fabricate and assemble the antenna device above the LCD display, and dispose the cable line along one side of the LCD monitor to extend downward for connecting with the network card of the notebook. Though such design can eliminate the inconvenience of carrying some assembly required and can reduce the incautious damage hazards. However, it is necessary to consider signal-shielding effect of the cable line. And further, it is required to fabricate connectors on the two ends of the cable line for connecting with the network card, thereby increasing the prime cost thereof.

SUMMARY OF THE INVENTION

It is therefore an objective of the present invention to provide a design of fabricating a planar antenna device in the housing of the display panel of the notebook computer.

The present invention discloses a notebook computer being capable of transmitting and receiving data via an antenna hidden and built in the housing of a display of the notebook computer. The notebook computer comprises the following components. A display panel is contained and assembled in a panel housing. There is a reserved space, generally with a height less than 1.5 cm, left between the top edge of the display panel and the inner surface of the panel housing. A planar antenna made of a bar-shaped circuit board and having a width of 1.0~1.4 cm is disposed upright standing on the top edge of the display panel. The planar antenna is just contained in the reserved space between the display panel and the panel housing. The planar antenna further includes antenna patterns maybe defined on the peripheral area of the bar-shaped circuit board and a circuit, i.e. a decoding circuit, maybe fabricated on the central area of the bar-shaped circuit board. Besides, a transmitting line is disposed along the inner of the panel housing for connecting the PCB antenna and a motherboard of the notebook computer, so as to transmit and receive the digital signals decoded by the planar antenna. Except the above manner of disposing the planar antenna on the top edge of the display panel, the planar antenna can also be fabricated on the rear side of the display panel, or fabricated on side edge of the display panel.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF THE PREFERRED EMBODIMENT

The present invention disclosed a portable electrical device being capable of transmitting and receiving data via an antenna hidden and built in a housing of a display of the portable electrical device, such as a notebook computer. By fabricating a planar antenna, such as a PCB antenna, on the top edge of the display panel in the panel housing, the above-mentioned conventional issues, such as damaging the antenna device due to incautious operating, can be prevented effectively, and further the prime cost can be reduced considerably. Especially, it is not required to increase the thickness of the panel housing according to the design provided in the present invention, thereby satisfying the design characteristics of smaller size and less weight. The detailed description of the present invention is as follows.

Figure 1:
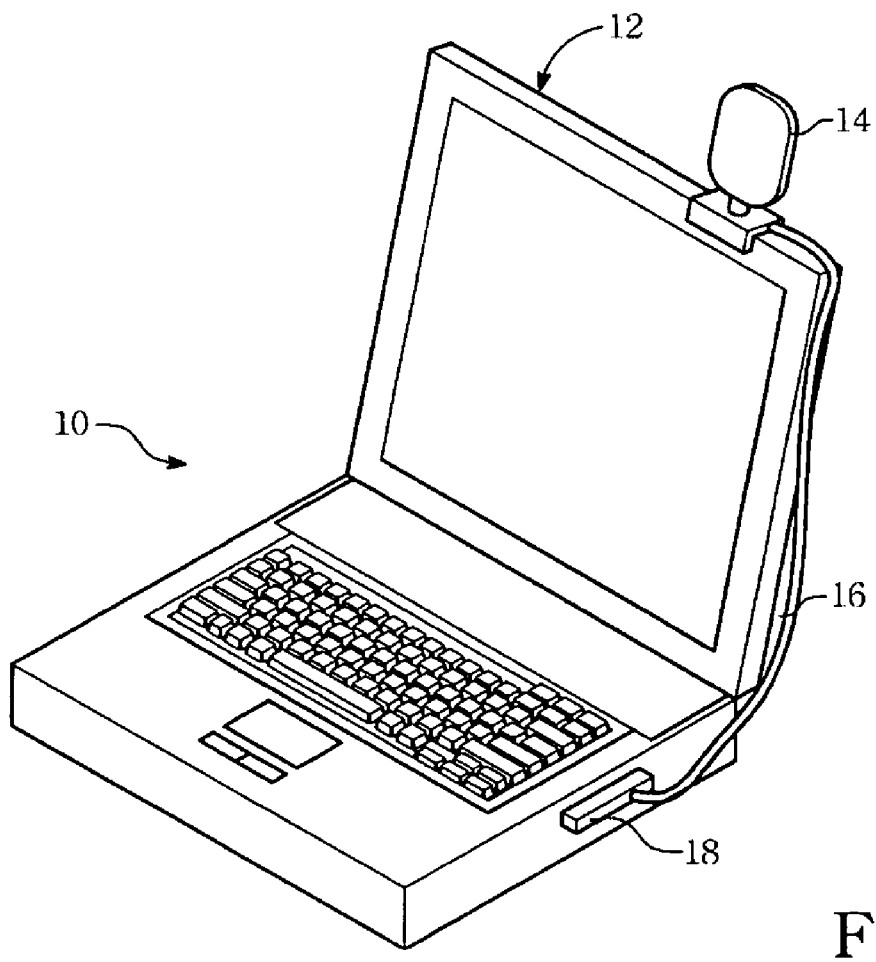
FIG. 1 is a schematic view showing a notebook with an antenna device disposed on the outside thereof according to the prior art.
Figure 2:
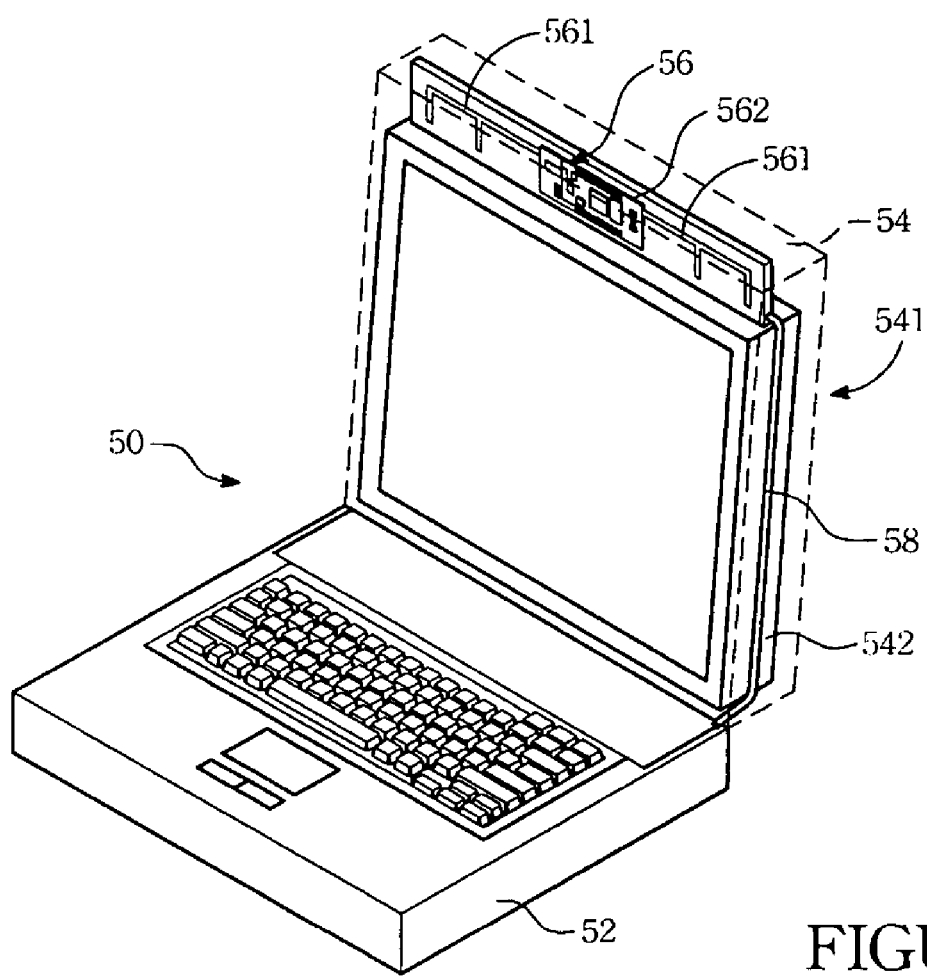
FIG. 2 is a schematic view showing a notebook with a PCB antenna fabricated on the top edge of a display panel in the notebook according to the present invention.

Please refer to FIG. 2, a notebook computer 50 being capable of wireless transmitting is illustrated. In the first embodiment of the present invention, the notebook computer 50 comprises a host case 52 and a display such as LCD display 54 connected pivotally with the host case 52 through at least a hinge (not shown). When the notebook computer 50 is not booted and used, the LCD display 54 can be folded down to cover the host case 52. In the case of operating the notebook 50, the LCD display 54 can be lifted up and the notebook 50 can be booted for loading the operating system. Moreover, the LCD display 54 comprises a panel housing 541 and a display panel 542 assembled and contained in the panel housing 541. On the front surface of the panel housing 541 an opening is formed to expose the screen of the display panel 542.

In general, the display panel 542 usually is fabricated with a rectangular shape, so when it is assembled into a panel housing 541, the left and right edges of the display panel 542 are nearly closed to the inner sidewall of the panel housing 541. But, between the top edge of the display panel 542 and the panel housing 541, there is a reserved space, with height less than 1.5 cm, and which is enough to contain a planar antenna 56. As shown in FIG. 2, the planar antenna 56 is fabricated on a bar-shaped circuit board, so as to be assembled on the top edge of the display panel 542 in the panel housing 541. For inserting and disposing the planar antenna 56 successfully into the reserved space between the LCD display 542 and the panel housing 541, the bar-shaped circuit board is formed with a width of 1.0~1.4 cm (preferred is about 1.2 cm) and is disposed to stand upright on the top edge of the display panel 542.

Still referring to FIG. 2, the planar antenna 56 includes antenna patterns 561 defined on the peripheral area of the bar-shaped circuit board and a decoding circuit 562 fabricated on the central area of the bar-shaped circuit board. The antenna patterns 561 are introduced to receive or send radio frequency signals. And the decoding circuit 562 is used to transfer the radio frequency signals received into the digital signals, or transferring the digital signals from the host case 542 into the radio frequency signals for sending outwardly. It is noted that, in this embodiment, the antenna patterns are defined on the left and right sides of the bar-shaped circuit board and the decoding circuit is fabricated on the central area thereof. However, the bar-shaped circuit board also can be designed with the antenna pattern defined on one side and the decoding circuit fabricated on the other side thereon.

For connecting the planar antenna 56 and host case 52, a digital transmitting line 58 is fabricated on the inner sidewall of the panel housing 541. One terminal of the transmitting line 58 is connected to the planar antenna 56, and the other is extending along the inner sidewall of the panel housing 541 to connect with a motherboard of the host case 52, so as to transmit digital signals decoded by the planar antenna. Because the planar antenna 56 includes the antenna patterns and the decoding circuit formed thereon, only one transmitting line, such as USB(universal serial bus)1.1, USB2.0, or IEEE 1394 transmitting line, can be applied to connect the planar antenna 56 and the motherboard of the notebook 50, for transmitting and exchanging digital signal there between. Besides, because the current motherboard are fabricated with 4~8 sets of USB connectors, the above digital transmitting line 58 can be connected directly to these USB connector on the motherboard.

Figure 3:
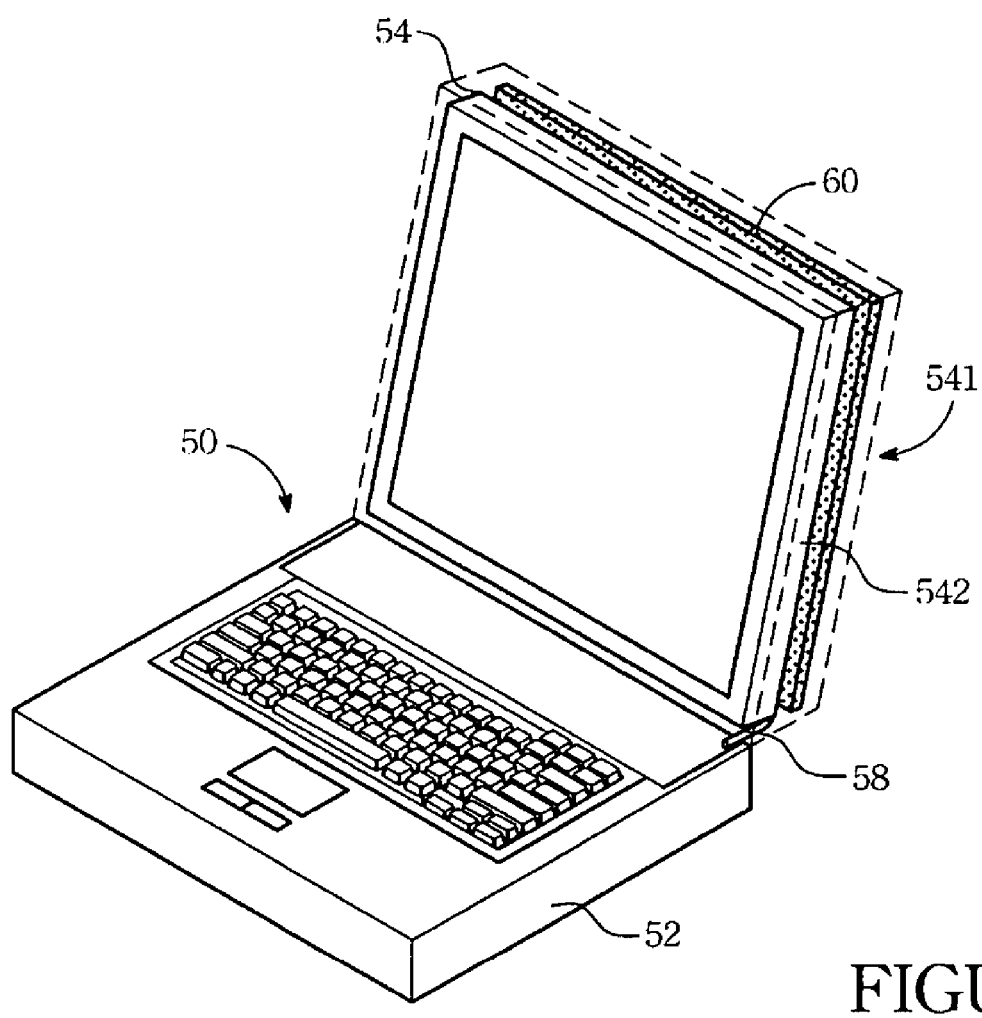
FIG. 3 is a schematic view showing a notebook with a PCB antenna fabricated on the real side of a display panel in the notebook according to the present invention.

Please refer to FIG. 3, in the second embodiment of the present invention, the planar antenna 60 is fabricated on the rear side of the display panel 542 and in the reserved space between the display panel 542 and the housing 541. Similarly, the transmitting line 58 can transmit the information received and decoded by the planar antenna 60 to the host case. It is noted that the rear space of the display panel 542 is a little large, so the dimension of the planar antenna 60 will not be limited as that in the first embodiment.

Figure 4:
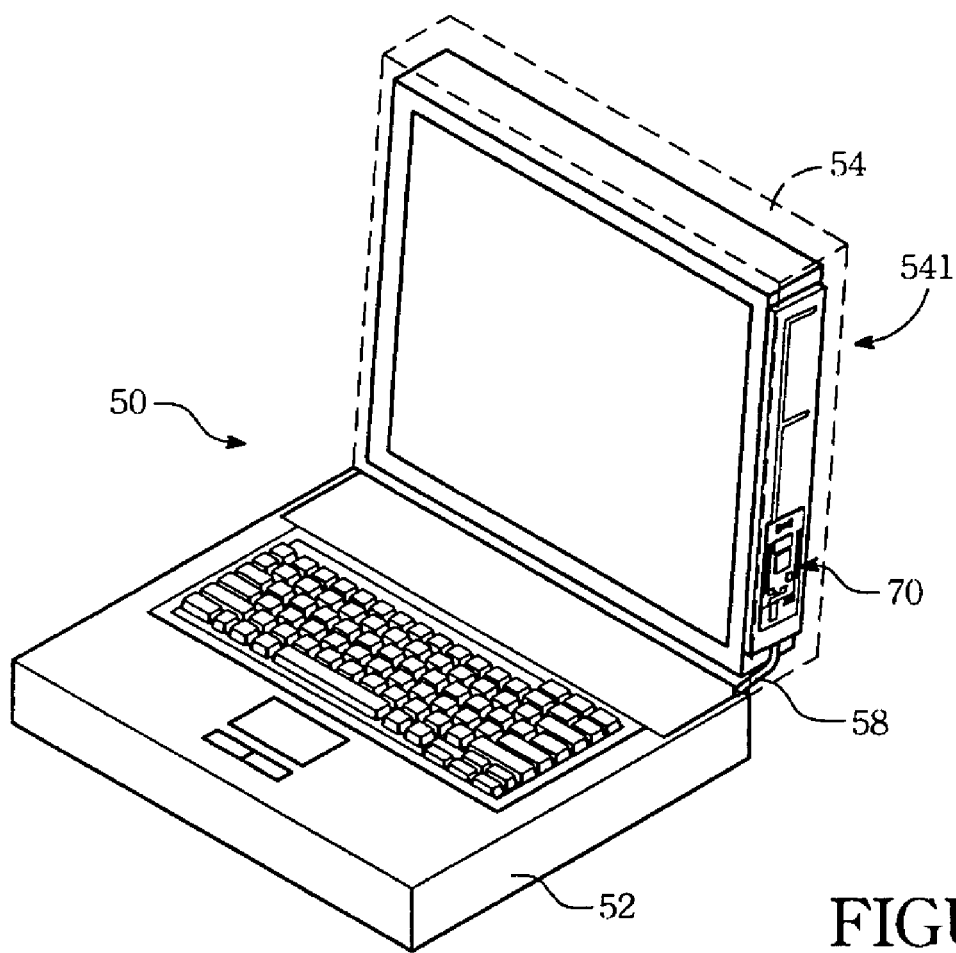
FIG. 4 is a schematic view showing a notebook with a PCB antenna fabricated on a side edge of a display panel in the notebook according to the present invention.

Then, please refer to FIG. 4, in the third embodiment of the present invention, the planar antenna 70 is fabricated on one lateral edge (right or left side) of the display panel 542 and contained in the space between the display panel 542 and the housing 541. It is noted that, though in FIG. 4, the planar antenna 70 is attached onto the lateral edge of the display panel 542, however, in actual practice, the planar antenna 70 can also be mounted to hang or stand aside the display panel 542.

The design of fabricating the planar antenna onto the display panel disclosed in the present invention has following advantages: (1) because the planar antenna and the transmitting line both are assembled in the panel housing, the problems of careless bump or stumble to cause the antenna damaged are effectively avoided. (2) In the first embodiment, there is no need to increase the thickness of the panel housing because the planar antenna is mounted on the top edge of the display panel, thereby satisfying the current design requirements of less weight and smaller size. (3) The planar antenna is mounted directly onto the display panel, so the ground lines on the display panel can also be used to remove the accumulated ions on the planar antenna. (4) Because the current motherboard is fabricated with 4~8 sets of USB connectors thereon, the transmitting line of the present invention extending to the host case can connect to the USB connectors formed on the motherboard directly. Therefore, the present design of motherboard can still work, and there is no need to change for adding extra connector on the motherboard to connect with the radio frequency transmitting line as the prior art.

The invention has been described using exemplary preferred embodiments. However, it is to be understood that the scope of the invention is not limited to the disclosed embodiments. On the contrary, it is intended to cover various modifications aid similar arrangements. The scope of the claims, therefore, should be accorded the broadest interpretation so as to encompass all such modifications and similar arrangements.

What is claimed is:

1. A portable electrical device with wireless transmission function comprising:
a host case, having a motherboard therein; and
a display module, pivotally connected with said host case, having a housing for containing a display panel and a planar antenna assembled therein, wherein said planar antenna is connected to said motherboard via a transmitting line and is made of a circuit board and has antenna patterns defined on the peripheral area of the circuit board and a decoding circuit fabricated on the central area of the circuit board.

2. The portable electrical device according to claim 1, wherein said planar antenna is fabricated on a top edge of said display panel and made of a circuit board, and said planar antenna has antenna patterns defined on the peripheral area thereof.

3. The portable electrical device according to claim 2, wherein said planar antenna has a width of 1.0~1.4 cm.

4. The portable electrical device according to claim 1, wherein said transmitting line is made of a Universal Serial Bus (USB) line.

5. The portable electrical device according to claim 1, wherein said transmitting line is chosen from the group consisting of USB1.1, USB2.0, and IEEE 1394 transmitting lines.

6. The portable electrical device according to claim 1, wherein said portable electrical device is a notebook.

7. The portable electrical device according to claim 1, wherein said planar antenna is fabricated on the rear side of said display panel and is contained in the space between said display panel and said housing.

8. The portable electrical device according to claim 1, wherein said planar antenna is fabricated on an edge side of said display panel and is contained in the space between said display panel and said housing.

9. A portable electrical device being capable of wireless transmitting data, said portable electrical device comprising:
- a display panel, fabricated in a panel housing;
- a planar antenna, assembled in said panel housing and standing upright on the top edge of said display panel, wherein said planar antenna includes antenna patterns defined on the peripheral area of a circuit board and a decoding circuit fabricated on the central area of the circuit board and a decoding circuit fabricated on the central area of the circuit board; and
- a transmitting line, assembled in said panel housing, for connecting said planar antenna and a motherboard of said portable electrical device.

10. The portable electrical device according to claim 9, wherein said transmitting line is a USB line.

11. The portable electrical device according to claim 9, wherein said transmitting line is chosen from the group consisting of USB1.1, USB2.0, and IEEE 1394 transmitting lines.

12. A notebook being capable of wireless transmitting data, said notebook comprising:
- a display panel, assembled in a panel housing, wherein between the top edge of said display panel and the top edge of said panel housing a space with a height less than 1.5 cm is reserved;
- a planar antenna, formed of a circuit board with a width of 1.0~1.4 cm, wherein said planar antenna is assembled to stand upright on the top edge of said display panel and is contained in said space between said display panel and said panel housing, and said planar antenna includes antenna patterns defined on the peripheral area of said circuit board and a decoding circuit fabricated on the central area of said circuit board; and
- a transmitting line, assembled in said panel housing, for connecting said planar antenna and a motherboard of said notebook.

* * * * *